(12) United States Patent
Downey et al.

(10) Patent No.: US 12,426,750 B2
(45) Date of Patent: Sep. 30, 2025

(54) POTTY TRAINING DEVICE

(71) Applicant: Totsquat Inc., Sacramento, CA (US)

(72) Inventors: Kamali Downey, Sacramento, CA (US); Ashla Downey, Sacramento, CA (US)

(73) Assignee: Totsquat Inc., Sacramento, CA (US)

( * ) Notice: Subject to any disclaimer, the term of this patent is extended or adjusted under 35 U.S.C. 154(b) by 1 day.

(21) Appl. No.: 17/894,880

(22) Filed: Aug. 24, 2022

(65) Prior Publication Data

US 2022/0400912 A1 Dec. 22, 2022

Related U.S. Application Data

(63) Continuation of application No. PCT/US2021/019687, filed on Feb. 25, 2021.

(60) Provisional application No. 62/981,394, filed on Feb. 25, 2020.

(51) Int. Cl.
*A47K 11/06* (2006.01)
(52) U.S. Cl.
CPC .................. *A47K 11/06* (2013.01)
(58) Field of Classification Search
CPC ......... A47K 11/04; A47K 11/06; A47K 13/06
See application file for complete search history.

(56) References Cited

U.S. PATENT DOCUMENTS

| | | |
|---|---|---|
| 2,446,381 A | 8/1948 | Middleton |
| 5,083,325 A | 1/1992 | Vitullo |
| D356,365 S | 3/1995 | Liao |
| D375,544 S | 11/1996 | Nakata et al. |
| 5,903,932 A * | 5/1999 | Whitesel .............. A47K 11/105 4/476 |

(Continued)

FOREIGN PATENT DOCUMENTS

| | | | |
|---|---|---|---|
| CN | 103892762 A * | 7/2014 | |
| EP | 2000068 A1 * | 12/2008 | ............. A47K 11/06 |

(Continued)

OTHER PUBLICATIONS

Modi et al., "Implementation of a Defecation Posture Modification Device: Impact on Bowel Movement Patterns in Healthy Subjects," J. Clin. Gastroenterol, vol. 53, 2019, pp. 216-219.

(Continued)

*Primary Examiner* — Erin Deery
(74) *Attorney, Agent, or Firm* — Cooley LLP

(57) ABSTRACT

A potty training device includes a base having walls defining an interior cavity having an opening for receiving a receptacle, the base having: a height between a bottom surface and a top surface of the base, a width between opposing sides of the base, and a length between a first end and a second end of the base, where: the opening is positioned between the first and second ends, and the length of the base is greater than the width of the base. The potty training device includes grasping means coupled to the first end of the base, where the width and the height of the base are sufficient to enable the user to assume a squatting position straddling said device over the opening of said base. Sizes, shapes and arrangements of components of the potty training device enable prolonged squatting safety, easily and without fatigue, thereby facilitating potty training.

20 Claims, 7 Drawing Sheets

(56) References Cited

U.S. PATENT DOCUMENTS

| | | | |
|---|---|---|---|
| D417,417 | S | 12/1999 | Keegan et al. |
| D491,645 | S | 6/2004 | Shibata et al. |
| D491,646 | S | 6/2004 | Shibata et al. |
| D528,479 | S | 9/2006 | Kende |
| D571,865 | S | 6/2008 | On |
| D612,302 | S | 3/2010 | Cheng |
| D639,402 | S | 6/2011 | Rathbone |
| D728,083 | S | 4/2015 | Todokoro |
| 10,016,067 | B2 | 7/2018 | Burns |
| 11,470,984 | B1 | 10/2022 | Wright et al. |
| D1,064,205 | S * | 2/2025 | Downey ................. D23/296 |

FOREIGN PATENT DOCUMENTS

| | | | |
|---|---|---|---|
| JP | 2006296518 | A * | 11/2006 |
| WO | WO-2021173846 | A1 | 9/2021 |

OTHER PUBLICATIONS

WIPO English translation of CN103892762A, published Jul. 2, 2014, 5 pages.

Extended European Search Report for European Application No. EP21761163.1 dated Apr. 30, 2024, 9 pages.

Final Office Action for U.S. Appl. No. 29/770,604, dated Jan. 18, 2024, 6 pages.

International Preliminary Report on Patentability for Application No. PCT/US2021/019687, mailed on Sep. 9, 2022, 6 pages.

International Search Report and Written Opinion for Application No. PCT/US2021/019687, mailed on May 7, 2021, 6 pages.

Non-Final Office Action for U.S. Appl. No. 29/770,604 dated Jun. 23, 2023, 14 pages.

Response to Final Office Action for U.S. Appl. No. 29/770,604, dated Mar. 26, 2024, 6 pages.

Response to Non-Final Office Action for U.S. Appl. No. 29/770,604, dated Sep. 15, 2023, 16 pages.

U.S. Appl. No. 29/770,604, filed Feb. 13, 2021.

Ha et al., "Distribution of Lengths of the Normal Femur and Tibia in Korean Children from Three to Sixteen Years of Age," J. Korean Med Sci, 2003, vol. 18, pp. 715-721.

Hawkes et al., "Leg length and sitting height reference data and charts for children in the United States," Data in Brief, vol. 32, 2020, 106131, 30 pages.

Design U.S. Appl. No. 29/770,604, filed Feb. 13, 2021; Kamali Downey et al.

* cited by examiner

POTTY TRAINING DEVICE

CROSS-REFERENCE TO RELATED APPLICATIONS

This application is a continuation of International Application No. PCT/US2021/019687 filed Feb. 25, 2021, which claims the benefit of priority to U.S. Provisional Application No. 62/981,394, filed Feb. 25, 2020, the contents of which is herein incorporated by reference in its entirety.

BACKGROUND

Potty training is often thought of as a cumbersome, drawn out process. One of the reasons why it takes so long and can be a cumbersome process is because the sitting position is extremely confusing to the child and goes against their natural instincts to go to the bathroom. Current potty training toilets are built with the "sitting" position as the primary position for toilet training for babies and toddlers. This is confusing to the child because instinctively all humans and especially babies and toddlers "squat" when they go to the bathroom. Throughout time, this is how children instinctively go to the bathroom and how they have learned to go to the bathroom.

The foregoing examples of related art and limitations related therewith are intended to be illustrative and not exclusive, and they do not imply any limitations on the disclosure presented herein. Other limitations of the related art will become apparent to those skilled in the art upon a reading of the specification and a study of the drawings.

SUMMARY

The following embodiments and aspects thereof are described and illustrated in conjunction with devices, tools and methods, which are meant to be exemplary and illustrative, not limiting in scope.

The embodiments of the potty training device described herein represent an improved Defecation Posture Modification Device (DPIVID). Its features provide a number of advantageous and beneficial technical and practical improvements over DPMDs and similar devices, systems and methods hitherto known to the inventors and the field at large. Among these are allowing the user of the device (e.g., child undergoing potty training) according to the present technology to achieve a low squatting position with their feet flat on the ground. This further facilitates the lessening of fatigue during use and thereby provides a more positive experience in potty training using the device according to the present disclosure. The advantageous and beneficial technical and practical improvements provided by the disclosed potty training device further flow to those who are responsible for or otherwise interested in potty training who are themselves not the actual users of the disclosed device. Thus, for example, parents potty training their children may enjoy a more positive experience where their children can be provided with more reinforcement in a positive manner, be trained faster, and generally benefit in a variety of positive ways with use of the potty training device of the present disclosure as a meaningful tool for this essential part of child development.

A first aspect of the present disclosure provides a potty training device, where the device includes a receptacle and a base, where the receptacle has a depth, a length, and a width, where the length is greater than the width; the base has a length, width, height, a first end and a second end, wherein the first end includes handlebars and the second end includes a backrest, where the base is configured to receive the receptacle and support the body of a user of the device, and where, when the receptacle is inserted into the base, the combined width of the base and the receptacle is narrow enough to allow the user to straddle the device, and where the height of the base is low enough to the ground to allow the user to squat over the device.

A second aspect of the present disclosure provides a potty training device. In a first embodiment, the device according to the second aspect includes a receptacle and a base. The receptacle has a depth, a length, and a width, where the length of the receptacle is greater than the width of the receptacle. The base has a length, a width, a height, a first end, and a second end. The first end of the base includes one or more handlebars. The base is sized and shaped to receive the receptacle. When the receptacle is inserted into the base, the combined width of the base and the receptacle is narrow enough to allow a user such as a child to straddle the device. The height of the base is low enough to the ground to allow the user (e.g., child) to squat over the device.

In a second embodiment of the second aspect of the present disclosure, the second end may include a backrest coupled to a portion of the base proximal to the second end of the base. In either the first or second, or in third, embodiment of the second aspect of the present disclosure, the base may be further configured to support the body of the user. In any one of the first through third, or in a fourth, embodiment of the second aspect of the present disclosure, the base may be further configured to enable alternating insertion and removal of the receptacle into and out from, respectively, from the base. In any one of the first through fourth, or in a fifth, embodiment of the second aspect of the present disclosure, at least one of the base and the receptable may include a snap fit to facilitate the aforementioned alternating insertion and removal of the receptacle.

In any one of the first through fifth, or in a sixth, embodiment of the second aspect of the present disclosure, the one or more handlebars may be positioned parallel to a top surface of the base. In any one of the first through sixth, or in a seventh, embodiment of the second aspect of the present disclosure, the one or more handlebars may extend distally from the base toward one or both sides of the base. In any one of the first through seventh, or in an eighth, embodiment of the second aspect of the present disclosure, the one or more handlebars may be disposed in an upwardly raised position relative to a top surface of the base. In any one of the first through eighth, or in a ninth, embodiment of the second aspect of the present disclosure, the one or more handlebars may include a plurality of handlebars.

In any one of the first through ninth, or in a tenth, embodiment of the second aspect of the present disclosure, the potty training device may further include a lid. In any one of the first through tenth, or in an eleventh, embodiment of the second aspect of the present disclosure, the lid may be configured to cover at least a portion of one or both of: a top surface of the receptable, and a top surface of the base, when the receptacle is inserted into the base. In any one of the first through eleventh, or in a twelfth, embodiment of the second aspect of the present disclosure, the base may include a plurality of walls which at least partially define an interior cavity of the base. In any one of the first through twelfth, or in a thirteenth, embodiment of the second aspect of the present disclosure, the base may be further configured to receive the receptacle into the interior cavity. In any one of the first through thirteenth, or in a fourteenth, embodiment of the second aspect of the present disclosure, the device may further include fitting means coupled to at least one of: the base, the receptacle, and the lid, to facilitate removably securing the lid to at least one of: the base, and the receptacle.

A third aspect of the present disclosure provides a potty training device. In a first embodiment, the device according to the third aspect includes a base having a plurality of walls defining an interior cavity having an opening for receiving a receptacle. The base has: a height between a bottom surface and a top surface of the base, a width between opposing sides of the base, and a length between a first end and a second end of the base. The opening is positioned between the first and second ends of the base. The length of the base is greater than the width of the base. The device includes grasping means coupled to, and upwardly spaced apart from, the first end of the base. The width and the height of the base are each sufficient to facilitate the user to assume a natural squat position straddling the device over the opening of the base and with the feet of the user touching the ground underneath a bottom surface of the base.

In a second embodiment of the third aspect of the present disclosure, the width and the height of the base may each be further sufficient to enable the user to assume the natural squat position with the feet of the user touching the ground underneath a bottom surface of the base. In either the first or second, or in third, embodiment of the third aspect of the present disclosure, the length of the base (e.g., in combination with the height and the width of the base), may be sufficient to enable the user to assume a natural squat position straddling the device over the opening of the base. In any one of the first through third, or in a fourth, embodiment of the third aspect of the present disclosure, the grasping means may include one or more handlebars. In any one of the first through fourth, or in a fifth, embodiment of the third aspect of the present disclosure, the grasping means may extend distally from the base toward one or both opposing sides of the base.

In any one of the first through fifth, or in a sixth, embodiment of the third aspect of the present disclosure, the device may further include the receptacle. In any one of the first through sixth, or in a seventh, embodiment of the third aspect of the present disclosure, the user may be a child. In any one of the first through seventh, or in an eighth, embodiment of the third aspect of the present disclosure, the base may be further configured to support the weight of the user in the natural squat position. In any one of the first through eighth, or in a ninth, embodiment of the third aspect of the present disclosure, the base may be further configured to enable alternating insertion and removal of the receptacle into and out from, respectively, the interior cavity of the base via the opening. In any one of the first through ninth, or in a tenth, embodiment of the third aspect of the present disclosure, the device may further include a backrest coupled to the second end of the base. In any one of the first through tenth, or in an eleventh, embodiment of the third aspect of the present disclosure, the second end comprises the backrest.

Features summarized above for any of the first, second and third aspects of the present disclosure can be readily, and without undue experimentation, combined, exchanged and interchanged amongst the various aspects and embodiments of the present disclosure. In addition to the examples, aspects and embodiments described above, further aspects and embodiments will become apparent by study of the following descriptions. The summary above is a list of example implementations, not a limiting statement of the scope.

BRIEF DESCRIPTION OF THE DRAWINGS

The accompanying figures, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Figure 1:
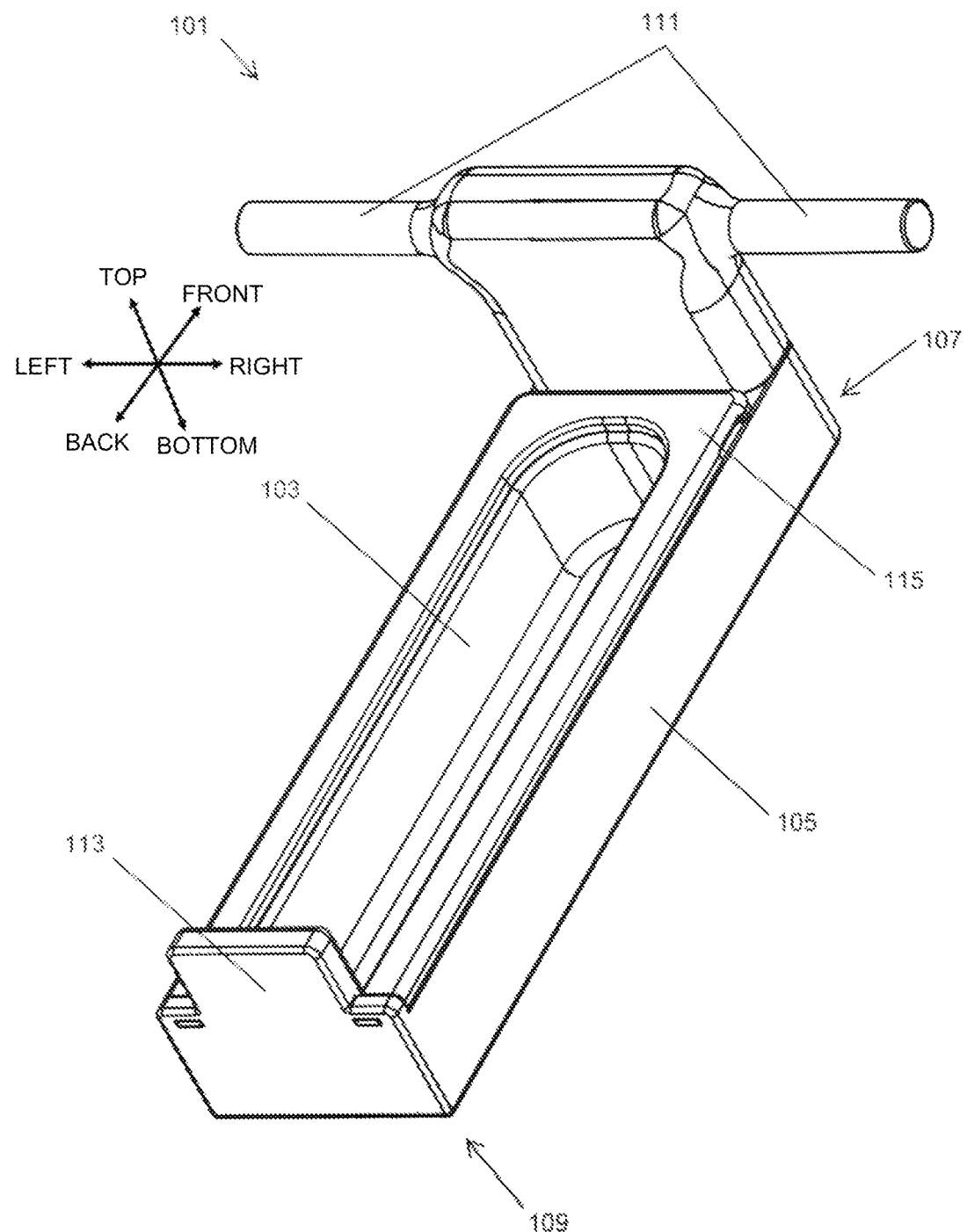
FIG. 1 is an isometric view of the potty training device of the present disclosure.
Figure 8:
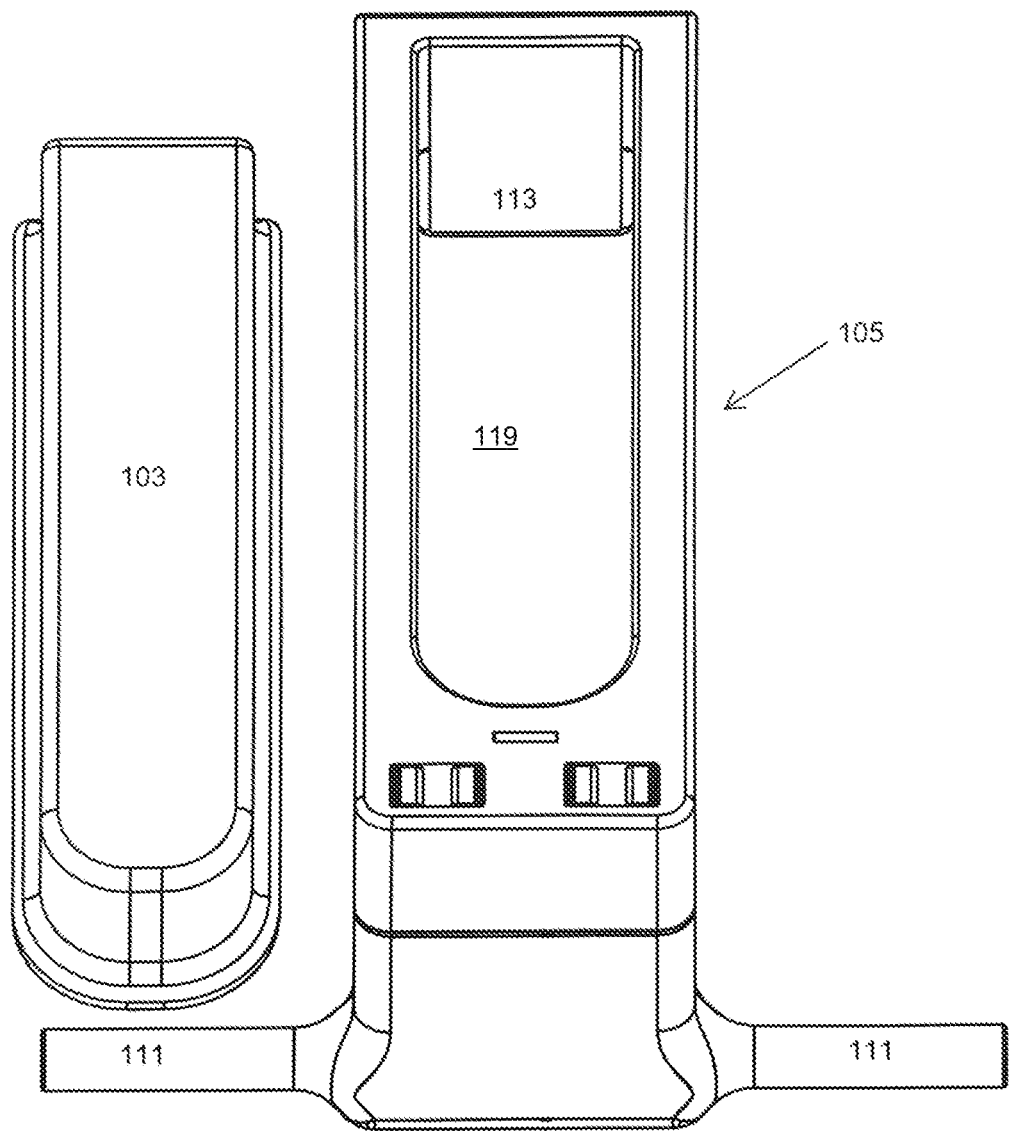
FIG. 8 is a bottom perspective view of the potty training device with the receptacle insert removed from the base.

FIG. 1 is an isometric view of the potty training device 101 of the present disclosure. One or more embodiments of the present disclosure provide a potty training device 101, where the device 101 includes a receptacle 103 and a base 105, where the receptacle 103 has a depth, a length, and a width. The length of receptacle 103 is greater than the width of receptacle 103. Base 105 has a length (between first 107 and second 109 ends), width (left to right) and height (top to bottom). In an example, each of the length, width and height of base 105 is greater than or equal to the corresponding dimensions of receptacle 103, such that receptacle 103 may be readily and removably fitted into a suitably sized compartment 119 of base 105, as shown in FIG. 8. Accordingly, base 105 is formed from a plurality of walls (e.g., four walls). In the illustrated embodiment, the plurality of walls of base 105 make up the front, back and two sides of base 105, where a top side or surface of base 105 is at least partially uncovered to thereby define a cavity or compartment 119 within the four walls into which receptacle 103 may be alternately inserted and removed. In the inserted position, a top, open side or surface of receptacle 105 may be plane-parallel to the top side or surface of base 105, where a lip of receptacle rests on top side or surface of base 105 in a state of dynamic equilibrium facilitated at least in part by the force(s) of gravity and/or friction. In one embodiment, the bottom of base 105 is at least partially uncovered, as shown in FIG. 8. In other embodiments, not shown, the bottom of base 105 is either fully covered or fully uncovered.

In some embodiments, at least one of the base 105 and the receptacle 103 may include a fitting means coupled to, or formed on in, either or both of those two components of device 101. Inclusion of the fitting means can facilitate the aforementioned alternating insertion and removal of the receptacle 103 by users of device 101. In a first example, means for fitting may include a snap fit mechanism, which can include a release lever, button, or the like, to permit the user of device 101 to alternately engage and disengage the snap fit mechanism to further facilitate the aforementioned alternating insertion and removal of the receptacle 103. In another example, means for fitting may include a post (or peg or nub or the like)-in-hole structure. One version of that structural arrangement can be a post formed on or coupled to on a bottom surface of a receptacle 103 lip that mates with a corresponding hole (or cavity) formed in a top surface of base 105. In this version, the user of device 101 aligns the post with the mating hole and inserts the post into the hole when placing receptacle 103 into base 105. Another version of the post-in-hole structure is essentially the converse case of the first version described above, where the user of device 101 aligns the post formed on or coupled to the top surface of base 105 with a mating hole (or cavity) formed in a bottom surface of the receptacle 103 and inserts the post into the hole when placing receptacle 103 into base 105. Persons having ordinary skill in the art are expected to readily recognize and appreciate additional known, or as yet unknown, fitting means suitable and applicable for use in removably securing together base 105 and receptacle 103 during use of device 101.

Figure 9:
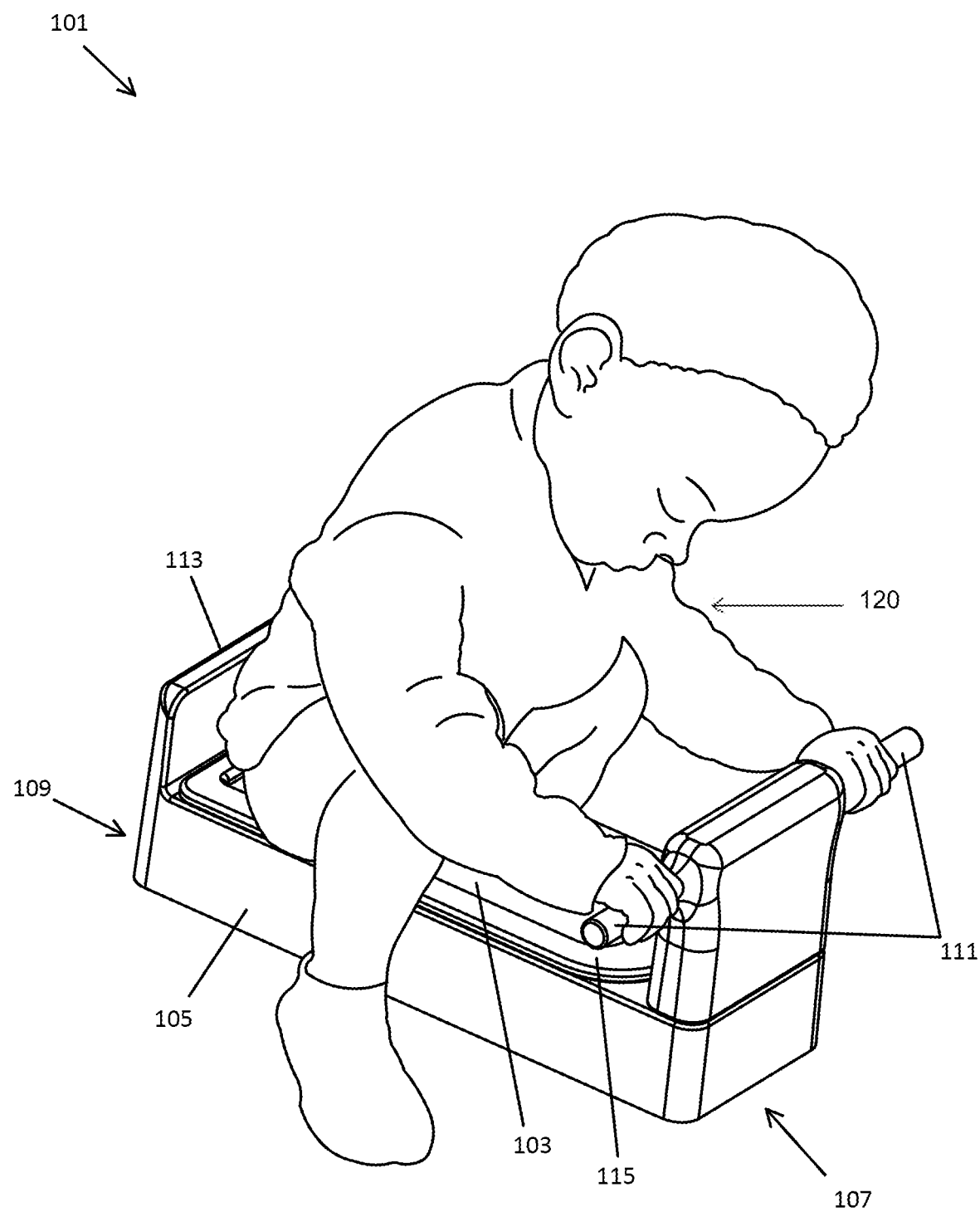
FIG. 9 depicts a child using the potty training device of the present disclosure.

Base 105 includes a first (e.g., front) end and a second (e.g., back) end. In the embodiment shown in FIG. 1, device 101 includes a pair or handlebars 111. In another embodiment, not shown, device 101 includes just one handlebar 111. In the embodiment of FIG. 1, the handlebars 111 are coupled, or couplable, to a portion of base 105 proximal to its first (e.g., front) end 107 so that a resulting position of handlebars 111 is raised by a distance above the top side of base 105. In the configuration shown in FIG. 1, handlebars 111 are positioned parallel to a top surface of base 105. However, in other embodiments, not shown, one or more handlebars 111 may be positioned differently (e.g., not parallel to top surfaces of base 105 and receptacle 103, or facing in a direction other to opposite sides), without departing from the scope and spirit of the present disclosure. While handlebar(s) 111 can assume a wide array of shapes, sizes, and ways to attach them to base 105 other than as shown in FIG. 1 without departing from the scope and spirit of the present disclosure, their general function in device 101 is to provide a user (e.g., child 120 as shown in FIG. 9) a structure to grab onto during use of device 101 to facilitate assuming an appropriate position for such use. As such, handlebar(s) 111, alone or in combination with the other features of device 101 disclosed herein, provide for an effective aid to potty training representing a substantial improvement over known devices and methods.

The second (e.g., back) end 109 of base 105 is the end opposite to, and distal from, first end 107 of base 105, as shown in FIG. 1. In the embodiment shown in FIG. 1, device 101 includes a backrest 113 coupled, or couplable, to a portion of the base 105 proximal to second end 109. While backrest 113 can assume any of a wide array of sizes and shapes in device 101 other than that shown in FIG. 1 without departing from the scope and spirit of the present disclosure, backrest 113 generally extends upward by a distance above a top surface of base 105. As such, backrest 113 provides for preventing a user (e.g., child 120) from undesirably sliding off the second end 109 of base 105 during operation of device 101.

In addition to having an upward facing opening sized and shaped to receive and securely, yet removably, hold receptacle 103, a size, structure and material of construction of base 105 is capable of supporting the weight of the device 101 (e.g., child 120). The dimensions of the device 101 and its components, as described above, provide that when the receptacle 103 is inserted into the base 105 during use, the combined width of the base 105 and the receptacle 103 is narrow enough to allow the user (e.g., child 120) to straddle the device 101. Likewise, the height of the base 105 is low enough to the ground (e.g., underneath the bottom of base 105 resting on a floor or other supporting surface) to allow the user (e.g., child 120) to squat over the device 101. As used herein, ground means a floor or any similar surface that is sufficient to provide a place to rest the bottom of device 101 in dynamic equilibrium either during or between usage of device 101.

The potty training device may further include a lid 115 to secure the receptacle 103 within the base 105. When so positioned atop base 105 and/or receptacle 103, a top surface of lid 115 may be plane-parallel to top surface(s) of base 105 and/or receptacle 103 and in a state of dynamic equilibrium facilitated at least in part by the force(s) of gravity and/or friction. The lid 115 and/or base 105 may further include cushioning for added comfort with a compressible material, such as rubber, foam rubber, compressed polyester, polyester fiberfill, medium or high density polyurethane foam, open cell foam, closed cell foam, fabric backed sew foam, polyethylene sheet, polyethylene foam, or equivalents thereof.

In some embodiments, at least one of: the base 105, the receptacle 103, and the lid 115, may include a fitting means coupled to, or formed on or in, one or more of those three components of device 101. Inclusion of the fitting means can facilitate removably securing the lid 115 to at least one of: the base 105, and the receptacle 103. In a first example, means for fitting may include a snap fit mechanism, which can include a release lever, button, or the like, to permit the user of device 101 to alternately engage and disengage the snap fit mechanism to further facilitate the aforementioned removable securing and alternating attachment and removal of lid 115 to base 105 and/or receptacle 103. In another example, means for fitting may include a post (or peg or nub or the like)-in-hole structure. One version of that structural arrangement can be a post formed on or coupled to on a bottom surface of lid 115 that mates with a corresponding hole (or cavity) formed in a top surface of base 105 and/or receptacle 103. In this version, the user of device 101 aligns the post with the mating hole and inserts the post into the hole when placing lid 115 upon base 105 and/or receptacle 103. Another version of the post-in-hole structure is essentially the converse case of the first version described above, where the user of device 101 aligns the post formed on or coupled to the top surface(s) of receptacle and/or base 105 with a mating hole (or cavity) formed in a bottom surface of the lid 115 and inserts the post into the hole when placing lid 115 onto base 105 and/or receptacle 103. Persons having ordinary skill in the art are expected to readily recognize and appreciate additional known, or as yet unknown, fitting means suitable and applicable for use in removably securing together lid 115, and base 105 and/or receptacle 103, during use of device 101.

Figure 2:
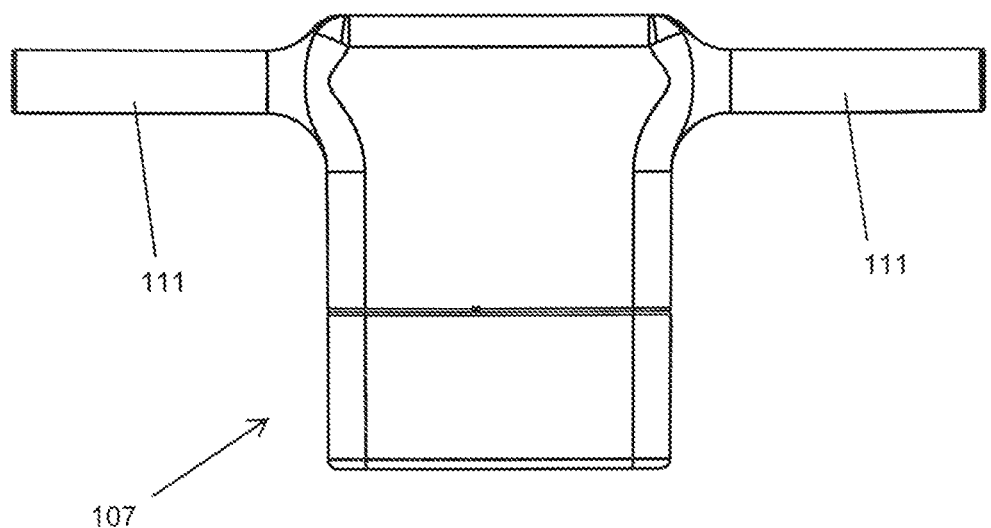
FIG. 2 is a front view of the potty training device of the present disclosure.
Figure 3:
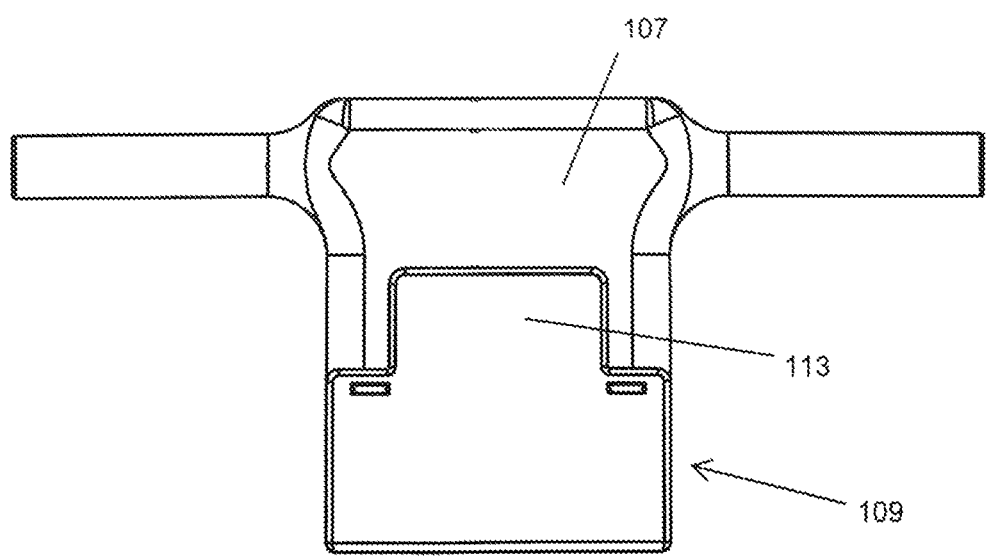
FIG. 3 is a back view of the potty training device of the present disclosure.
Figure 4:
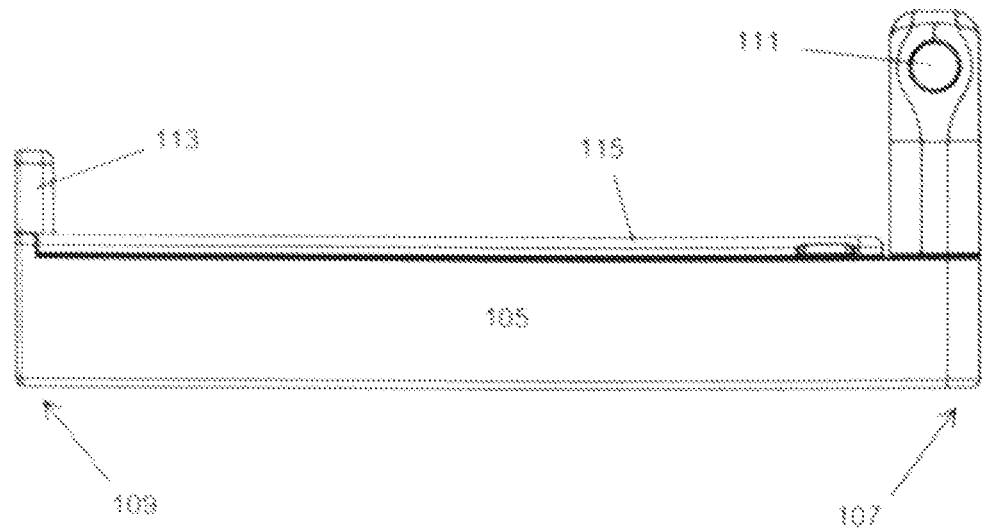
FIG. 4 is a right side view of the potty training device of the present disclosure.
Figure 5:
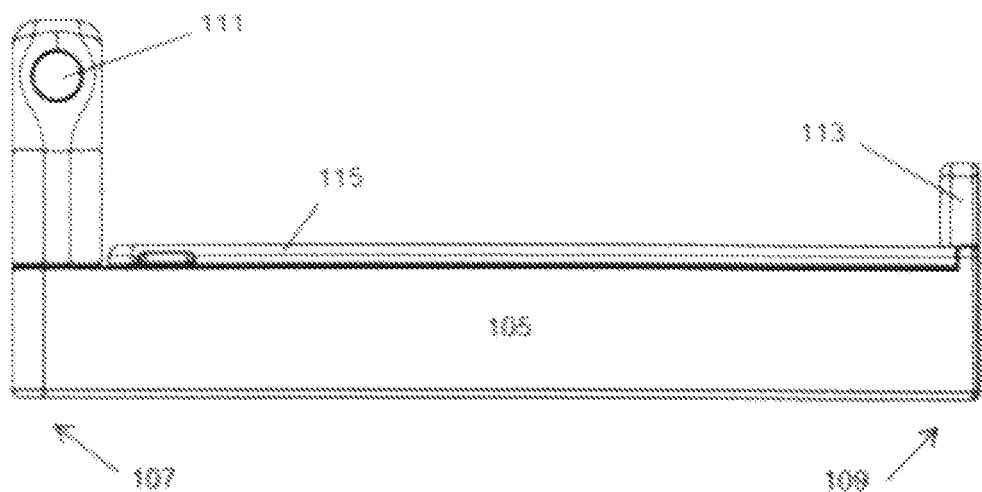
FIG. 5 is a left side view of the potty training device of the present disclosure.
Figure 6:
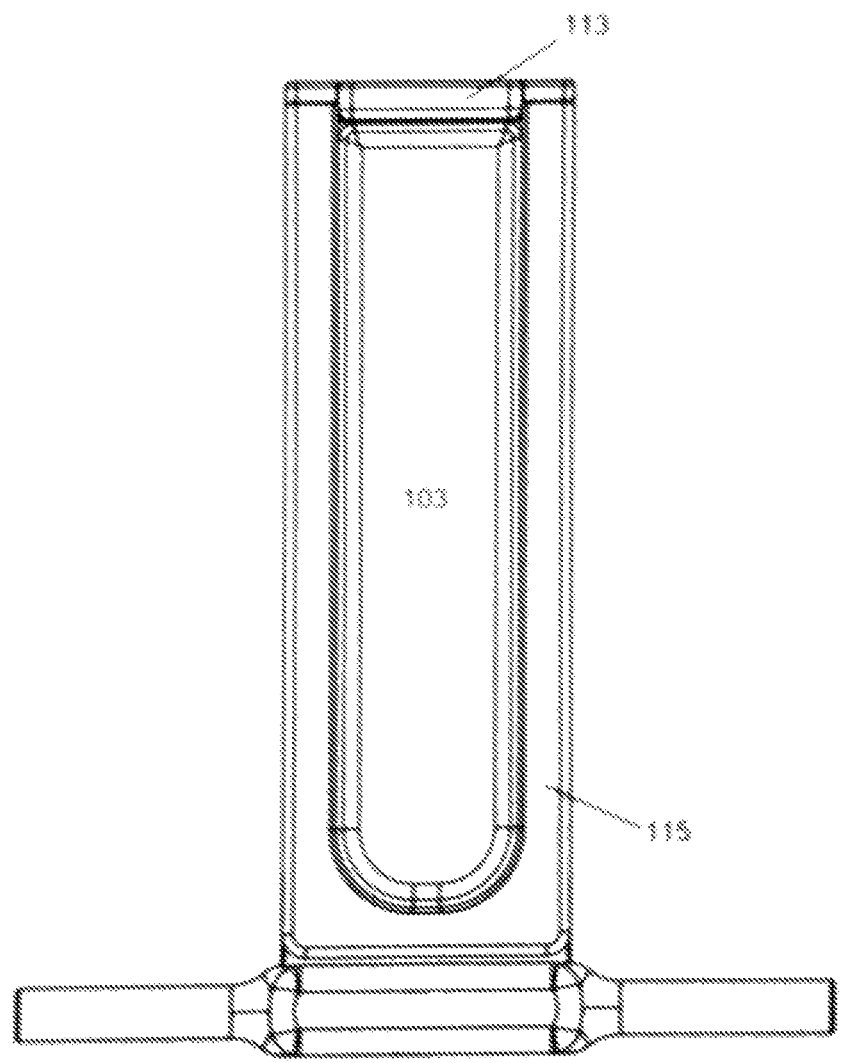
FIG. 6 is a top down view of the potty training device of the present disclosure.
Figure 7:
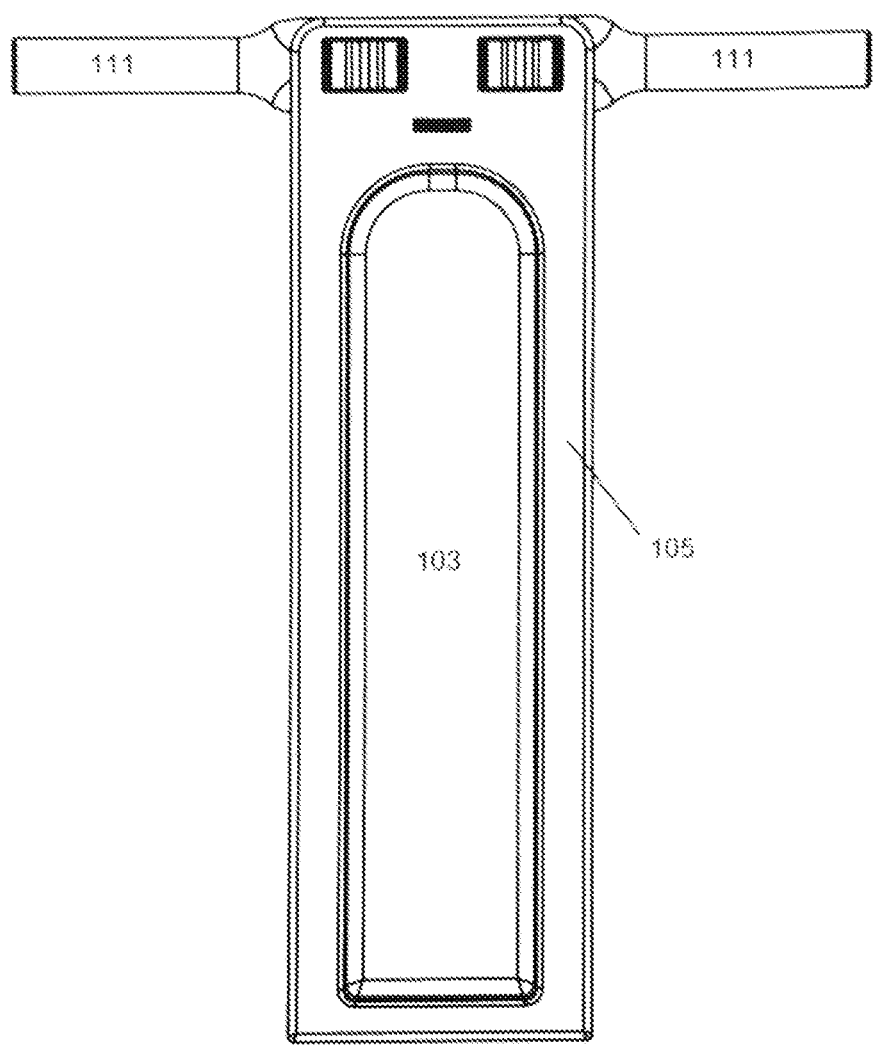
FIG. 7 is an underside view of the potty training device of the present disclosure.

Shown in FIGS. 2 and 3 are front and back views respectively of the potty training device 101 of the present disclosure. Shown in FIGS. 4 and 5 are right side and left side views respectively of the potty training device 101 of the present disclosure. FIG. 6 is a top down view, and FIG. 7 is a bottom up view, of the potty training device 101 of the present disclosure. Shown in FIG. 8 is a bottom perspective view of device 101 with the receptacle 103 removed from, and placed beside, the base 105.

As will be understood by one skilled in the art, a variety of materials may be used to construct the potty training device including, but not limited to, plastic, steal, metal, wood, fabric, leather, rubber, and combinations thereof While an essentially rectangular shape is shown, as will be understood by one skilled in the art there may be variations on the size and shape of the potty training device disclosed herein.

The potty training device may further include a means to releasably secure the device 101 to a floor, such as suction feet on the bottom of the base 105, rubber grippers, or similar anti-slip material so as to provide additional stability and to prevent the device 101 from shifting when the device 101 is in use. The device 101 may also be permanently attached to a floor or other supportive surface. Having the device 101 secure and/or immobile (e.g., in dynamic equilibrium) while in use also prevents the contents of the receptacle 103 from spilling.

The potty training device 101 may further include a splash guard on the receptacle. This may be an extra component that can be attached to the device or it may be built into the receptacle.

FIG. 9 depicts a child 120 using the potty training device 101 of the present disclosure. The above-described arrangement, sizes, dimensions, etc. of component parts of device 101 encourage a child 120 to comfortably assume a natural squat pose with ease during use of device 101. This provides a number of benefits to the child and those who are responsible or otherwise interested in potty training the child in a manner having numerous advantages over known devices and methods. As can be seen in FIG. 9, the height of receptacle 103 above floor or other supporting surface upon which the child's 120 feet rest facilitates both the natural squat pose but also preventing fatigue of the child 120 since the natural squat pose can be maintained for prolonged periods of time with the body weight supported by the base 105. Furthermore, the child 120 may grasp handlebars 111 during use of device 101, which not only makes the natural squat pose more secure and less fatiguing, but also may add an element of fun to the potty training process. Moreover, the security and safety of the child 120 in the natural squat position using device 101 is further enhanced by backrest 113, which prevents child 102 sliding off the back of device 101.

As will be understood by one skilled in the art, the above-described components of device 101 may be constructed out of a variety of materials, including for example, plastic, steal, metal, wood, fabric, leather, rubber, and combinations thereof. For example, handlebar(s) 111 may further include a compressible material, for example foam rubber, for added grip and comfort. As will be understood by one skilled in the art there may be any number of handlebar 111 designs, for example rods or knobs or combinations thereof, in order to provide a secure means for child 120 to grasp onto a secured structure during use of device 101. Handlebar(s) 111 may come in various sizes and shapes in device 101, and, in an example, device 101 is capable of accepting handlebar(s) 111 or similar hand grips in an interchangeable fashion, so as to accommodate users having varying sized hands. The handlebars 111 may further be embellished with attractive colors and/or characters, and may include additional elements to entice a child such as tassels or bells.

As will be understood by one skilled in the art, the backrest 113 may include additional elements, such as padding, and may be of a variety of shapes and sizes.

The above-described embodiments of the potty training device according to the present disclosure represent an improved Defecation Posture Modification Device (DPMD). Its features provide a number of advantageous and beneficial technical and practical improvements as compared to DPMDs and similar devices, systems and methods hitherto known to the inventors and the field at large. Among these are allowing the user of the device 101 (e.g., child 120) to achieve the low squatting position with their feet flat on the ground. This further facilitates the lessening of fatigue during use and thereby provides a more positive experience in potty training using the device 101 according to the present disclosure. The advantageous and beneficial technical and practical improvements provided by the disclosed device 101 further flow to those who are responsible for or otherwise interested in potty training who are themselves not the actual users of device 101. Thus, for example, parents potty training their children may enjoy a more positive experience where their children can be provided with more reinforcement in a positive manner, be trained faster, and generally benefit in a variety of positive ways with use of device 101 as a meaningful tool for this essential part of child development.

The foregoing description has been presented for purposes of illustration and description. It is not intended to be exhaustive or to limit the disclosure to the precise form shown and described, and other modifications and variations may be possible in light of the above teachings. The embodiment was chosen and described in order to best explain the principles and its practical application to thereby enable others skilled in the art to best utilize the potty training device and various modifications as are suited to the particular use contemplated. It is intended that the appended claims be construed to include other alternative embodiments insofar as limited by the prior art.

What is claimed is:

1. A potty training device, comprising:
    a receptacle having a top open side, a top surface, a depth, a length, and a width, the length being greater than the width;
    a base configured to receive the receptacle, the base having a top side, a length, a width, a height, a first end, and a second end opposite the first end, the second end including a substantially rectangular backrest; and
    one or more handlebars coupled to a portion of the base proximal to the first end of said base,
    wherein when said receptacle is inserted into the base:
        the top open side of the receptacle is plane-parallel to the top side of the base,
        the combined width of said base and said receptacle is narrow enough, and the height of said base is low enough to the ground to modify a defecation position of a user of the potty training device, the modified defecation position being a squatting position,
        a distance between the top surface of the receptacle and a top surface of the backrest being less than a distance between the top surface of the receptacle and a top surface of the handlebars, and
        the backrest is oriented substantially orthogonally to the top surface of the receptacle, and is sized and positioned to encourage a forward lean of the user.

2. The potty training device of claim 1, wherein the base is further configured to support the body of the user.

3. The potty training device of claim 1, wherein the base is further configured to enable alternating insertion and removal of the receptacle into and out from, respectively, the base.

4. The potty training device of claim 3, wherein at least one of the base or the receptacle has a snap fit mechanism to facilitate the alternating insertion and removal of the receptacle relative to the base.

5. The potty training device of claim 1, wherein the one or more handlebars are positioned substantially parallel to a top surface of the base.

6. The potty training device of claim 1, wherein the one or more handlebars extend distally from the base toward one or both vertically-oriented sides of the base.

7. The potty training device of claim 1, wherein the one or more handlebars are disposed in an upwardly raised position relative to the top surface of the base.

8. The potty training device of claim 1, wherein the one or more handlebars includes a plurality of handlebars.

9. The potty training device of claim 1, further comprising a lid.

10. The potty training device of claim 9, wherein the lid is configured to cover at least a portion of a top side of the base when the receptacle is inserted into the base.

11. The potty training device of claim 10, further comprising fitting means coupled to at least one of: the base, the receptacle, or the lid, to facilitate removably securing the lid to at least one of the base or the receptacle.

12. The potty training device of claim 1, wherein the base comprises a plurality of walls that at least partially define an interior cavity of the base.

13. The potty training device of claim 12, wherein the base is further configured to at least partially receive the receptacle into the interior cavity.

14. A potty training device comprising:
a base having a plurality of walls defining an interior cavity having an opening for receiving a receptacle, the base having: a height between a bottom surface and a top surface of the base, a width between opposing sides of the base, and a length between a first end and a second end of the base, the length being greater than the width, the second end including a substantially rectangular backrest; and
a set of one or more handlebars coupled to the first end of the base,
wherein when the receptacle is inserted into the base:
a top, open side or surface of the receptacle is plane-parallel to the top surface of the base,
the open side of the receptacle is positioned between the first and second ends of the base, and
the combined width and the height of the base and receptacle are sufficient to modify a defecation position of a user, the modified defecation position being a squatting position,
a distance between the top, open side or surface of the receptacle and a top surface of the backrest is less than a distance between the top, open side or surface of the receptacle and a top surface of the set of one or more handlebars, and
the backrest is oriented substantially orthogonally to the top, open side or surface of the receptacle, and is sized and positioned to encourage a forward lean of the user.

15. The potty training device of claim 14, wherein the width of the base is narrow enough and the height of the base is low enough to the ground to enable the user to assume the squatting position with the feet of the user flat on the ground.

16. The potty training device of claim 14, wherein the set of one or more handlebars is vertically spaced apart from the top surface of the base.

17. The potty training device of claim 14, wherein the set of one or more handlebars extends distally from the base toward one or both opposing sides of the base.

18. The potty training device of claim 14, further comprising the receptacle.

19. The potty training device of claim 14, wherein the base is further configured to support the weight of the user in the squatting position.

20. The potty training device of claim 14, wherein the base is further configured to enable alternating insertion and removal of the receptacle into and out from, respectively, the interior cavity of the base via the opening.

* * * * *